July 18, 1939.  E. A. JOHNSTON ET AL  2,166,411

TRACTOR

Filed July 3, 1937  8 Sheets-Sheet 2

Inventors
Edward A. Johnston
and Gustaf W. Engstrom
By V. F. Lusagne
Atty.

July 18, 1939.  E. A. JOHNSTON ET AL  2,166,411

TRACTOR

Filed July 3, 1937  8 Sheets-Sheet 3

Inventors
Edward A. Johnston
and Gustaf W. Engstrom
By V. F. Lavagne
Atty.

July 18, 1939. E. A. JOHNSTON ET AL 2,166,411
TRACTOR
Filed July 3, 1937 8 Sheets-Sheet 4

Inventors
Edward A. Johnston
and Gustaf W. Engstrom
By V. F. Lavagn
Atty.

July 18, 1939.  E. A. JOHNSTON ET AL  2,166,411
TRACTOR
Filed July 3, 1937   8 Sheets-Sheet 5

Inventors
Edward A. Johnston
and Gustaf W. Engstrom
By V. F. Lavagne
Atty.

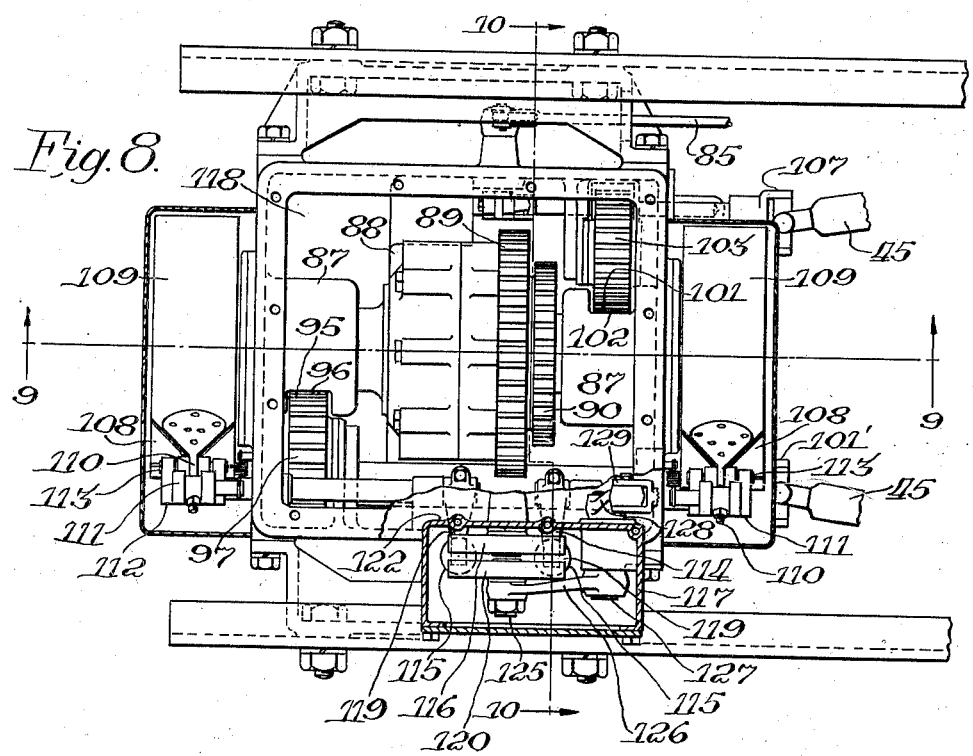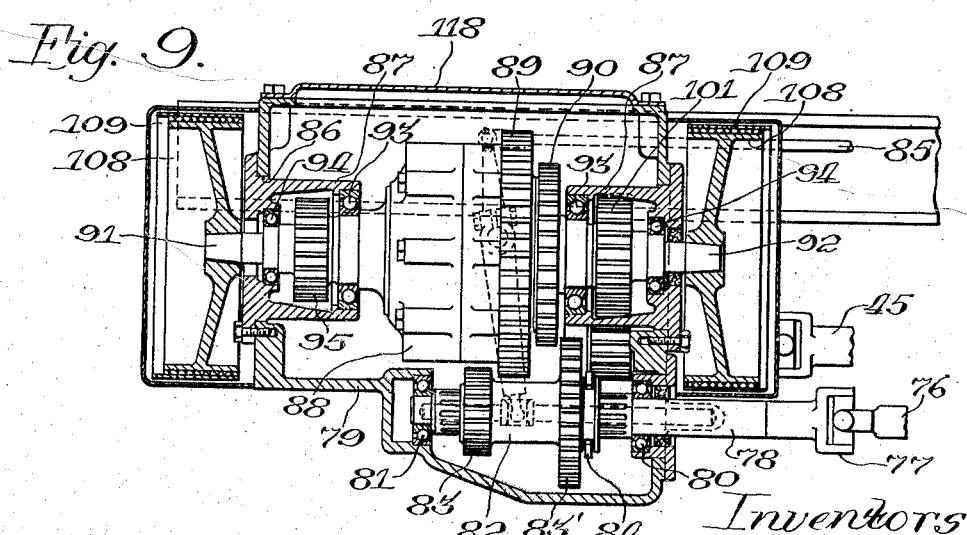

July 18, 1939.  E. A. JOHNSTON ET AL  2,166,411
TRACTOR
Filed July 3, 1937  8 Sheets-Sheet 7

Inventors
Edward A. Johnston
and Gustaf W. Engstrom
By V. F. Lauraque
Atty.

July 18, 1939.  E. A. JOHNSTON ET AL  2,166,411

TRACTOR

Filed July 3, 1937  8 Sheets-Sheet 8

Inventors
Edward A. Johnston
and Gustaf W. Engstrom
By V. F. Lavagna
Atty.

Patented July 18, 1939

2,166,411

UNITED STATES PATENT OFFICE 2,166,411

TRACTOR

Edward A. Johnston, Chicago, and Gustaf W. Engstrom, Riverside, Ill., assignors to International Harvester Company, a corporation of New Jersey Application July 3, 1937, Serial No. 151,802

9 Claims. (Cl. 180—22)

This invention relates to a wheel tractor. More particularly it relates to a six-wheel tractor with power applied to all wheels.

In the design and construction of tractors, various types of final drive means have been utilized. Also, tractors have been constructed with from two to eight wheels, various wheels of which have been driven. Where maximum traction is desired or under conditions where wheels can not be satisfactorily utilized, traction chains have been used, tractors of this type being identified as crawler tractors. As a step between the conventional tractor with two driven traction wheels and crawler tractors, it has been proposed to build tractors with a plurality of drive wheels. Tractors have been built having four wheels, all of which are driven, and six wheels, all of which are driven.

As conventional steering can not be utilized with more than two drive wheels without a very complicated power transmitting mechanism, usually some means other than steerable trucks are necessary for steering when operating tractors having four or more driven wheels. It is also necessary in order to properly distribute the weight of the tractor and to obtain satisfactory traction over uneven ground conditions to have the drive wheels more or less independent of each other.

The objects of the present invention will be better understood after a brief consideration is given to the above problems involved in a tractor having four or more driven wheels.

One principal object is to provide in a tractor having a rigid frame and a plurality of driven wheels an independent suspension system for each transversely aligned set of driving wheels.

Another correlated object is the provision of a resilient suspension means to provide a certain amount of independent movement of the drive wheel on one side relative to the drive on the other side of the same driving unit.

Another object is to provide a simplified mounting effective to perform the two principal objects above set forth.

Another object is to provide an improved and simplified drive mechanism for supplying power from the tractor engine to a plurality of independently driven traction wheels at each side of the tractor.

The above objects and others, which will be apparent from the detailed description to follow, are attained by a construction such as illustrated in the drawings. Insofar as the present invention is concerned, the tractor may be considered, first, as having a rigid frame on which the power plant, the transmission and the power divider are mounted. The engine and the transmission are of conventional construction. The power divider consists essentially of a differential assembly arranged with its axis longitudinally of the tractor frame. A drive shaft from the transmission supplies power in two selectable ratios to the differential carrier. The drive shafts from the differential are geared by intermediate drive gears to propeller shafts at opposite sides of the power divider arranged to transmit driving power to the units at each side of the tractor. All of the three drive wheels at each side of the tractor are arranged to be driven from the same source of power. Universal joints connect telescopic propeller shafts to drive shafts of the various units. Power from the power divider is supplied directly to the center unit and therefrom to the unit ahead and at the rear of the center unit.

To steer the tractor, brake drums are provided on the ends of the differential drive shafts, which extend through opposite end walls of the power divider housing. A brake applying mechanism is constructed selectively to apply braking effort to either of the brake drums for steering the tractor or to simultaneously apply braking effort to both drums for braking.

In the drawings:

Figure 8 is a plan view showing the power divider with the cover removed and with a portion of the brake control housing in section, as shown in Figure 11 at the line 8—8, to show the brake operating mechanism;

Figure 9 is a section taken on the line 9—9 of Figure 8;

Figure 1:
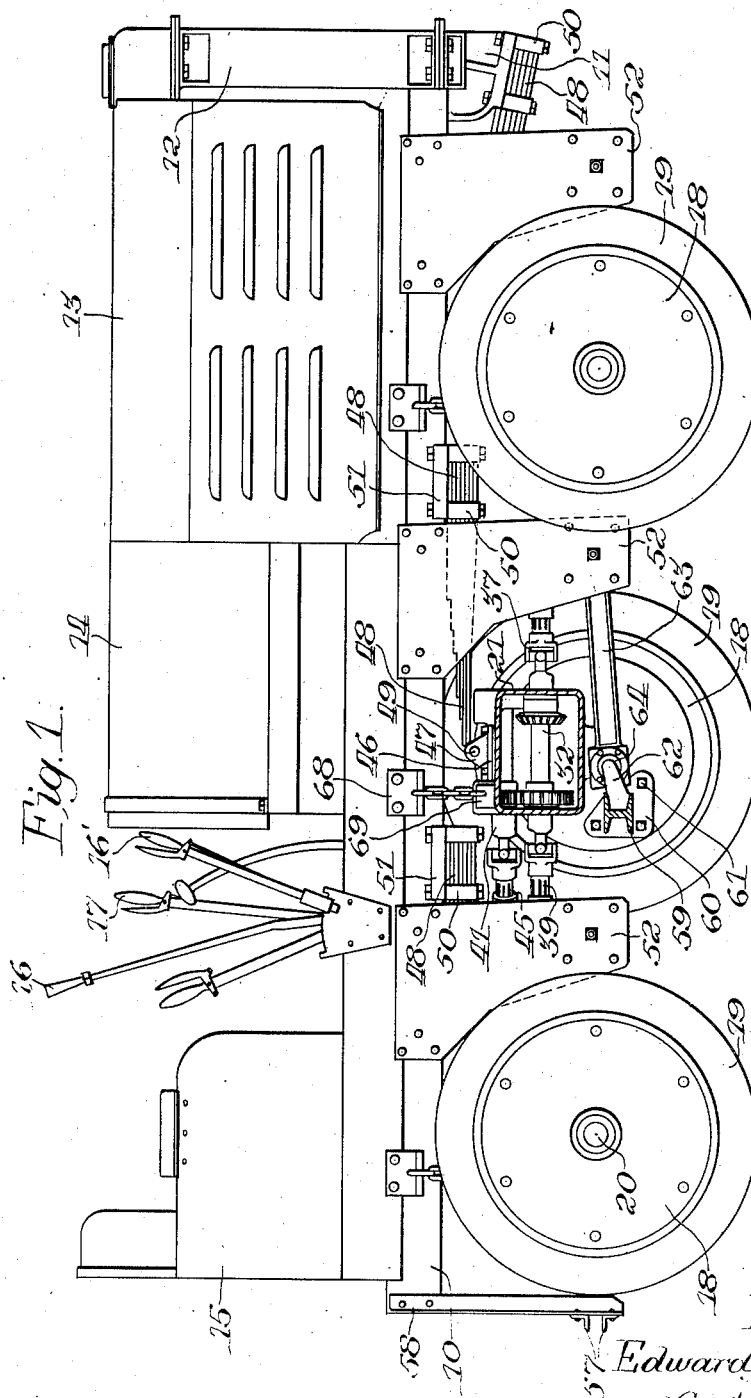
Figure 1 is a side elevation of a tractor embodying the invention with the center wheel on one side removed and with a portion of the driving housing broken away in section to illustrate the driving mechanism.
Figure 12:
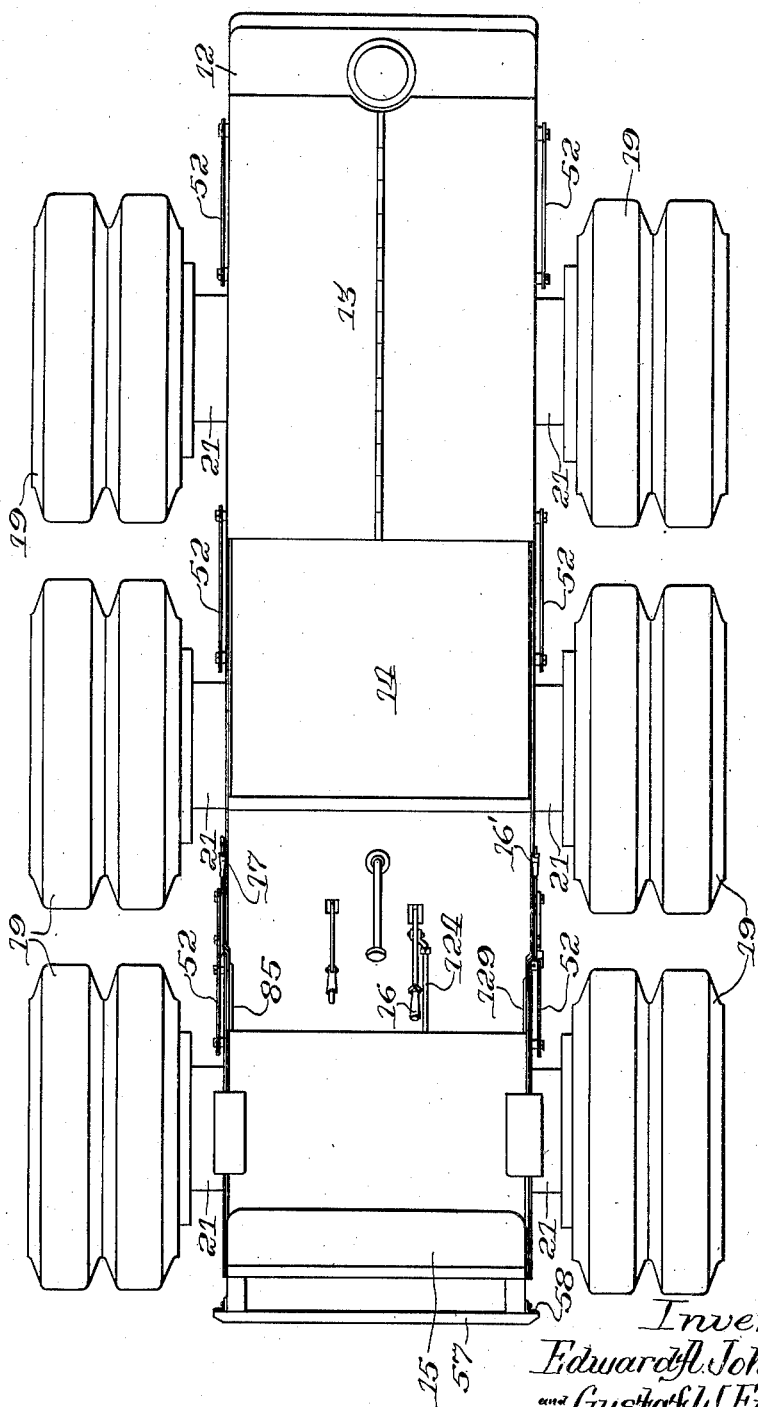
Figure 12 is a plan view of the tractor as shown in elevation in Figure 1.

In the description of the tractor, the frame will be considered as a unit having side frame members 10 and a cast transverse front cross member 11. A radiator 12 is shown on the frame being connected by a hood 13 with a gasoline tank 14 mounted substantially mid-way of the frame. A driver's seat 15 is shown at the rear of the tractor. A pair of levers is also illustrated for controlling the engine clutch and the transmission. Referring to Figures 1 and 12, the only levers which will be referred to by reference characters are the steering brake lever 16, the brake lever 16' and the change speed auxiliary transmission control lever 17.

In the description of the drive units, each set will be considered as the same and will bear the same reference characters. The slight difference in the angular positions of the mounting links does not affect the principle of the mechanisms involved. Also, the portions of each unit arranged at the opposite sides will be considered as identical and will bear the same reference characters.

Each drive wheel 18, which is illustrated as being provided with dual rubber tires 19, is rigidly secured to a stub axle shaft 20. Said shaft is rotatably mounted in a final drive housing 21. Each drive housing includes means for mounting an inner ball bearing assembly 22 which rotatably supports the inner end of the shaft 20. An outer ball bearing assembly 23 is carried by a cover plate 24, which is secured to the open face of the housing 21. An internal drive gear 25 carried by the shaft 20 meshes with a pinion gear 26 formed integrally with a shaft 27. Said shaft carries a bevel gear 28 at its inner end. The assembly, including the gear 26, the shaft 27 and the gear 28, is rotatably carried within the housing on ball bearing assemblies 29 and 30 supported by webs formed in the housing 21. The bevel gear 28 engages a bevel gear 31 carried by a drive shaft 32 extending longitudinally through the housing 21. Said shaft is rotatably supported in the end walls of the housing by ball bearing assemblies 33 and 34.

Up to this point, the construction of all three final drive housings is substantially identical. In the forward driving housing at each side, the drive shaft 32 extends rearwardly through the housing and is connected by a universal joint 35 to a splined propeller shaft assembly 36. The center unit at each side is provided with extensions of the drive shaft 32 forwardly and rearwardly. The forward extension of said shaft is connected by a universal joint 37 to the rear end of the propeller shaft assembly 36. The rearwardly extending end portion of the shaft 32 is connected by a universal joint 38 with an extensible propeller shaft assembly 39. Said assembly is connected by a universal joint 40 to a forward extension of the drive shaft 32 in the rear housing. It is to be understood that this construction is exactly the same at opposite sides of the tractor. It will be noted, however, that due to the rotation of the wheels being in different directions relative to the position of the drive shaft 32, the gears 31 are positioned at different sides of the gears 28 on opposite sides of the tractor.

Figure 4:
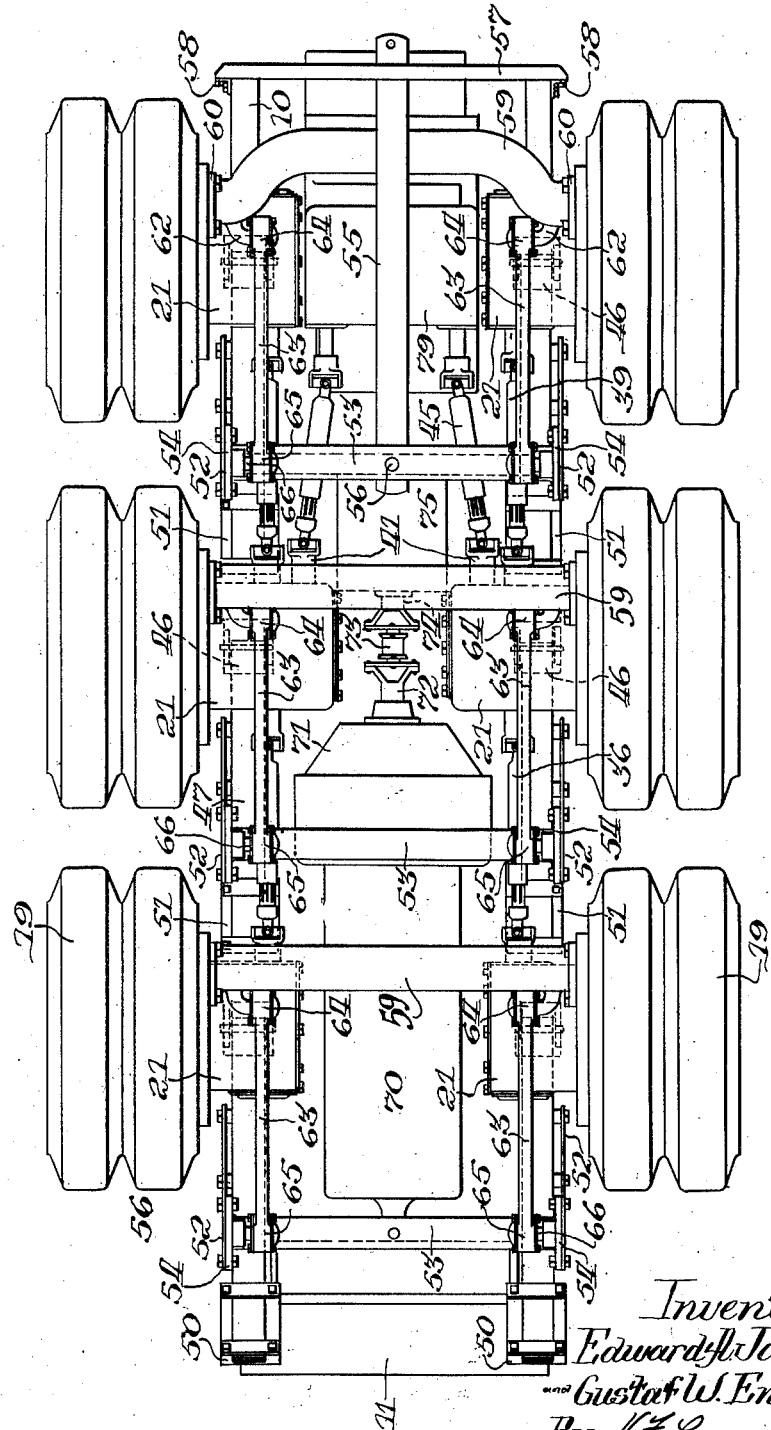
Figure 4 is a bottom view of the tractor shown in Figure 1.
Figure 5:
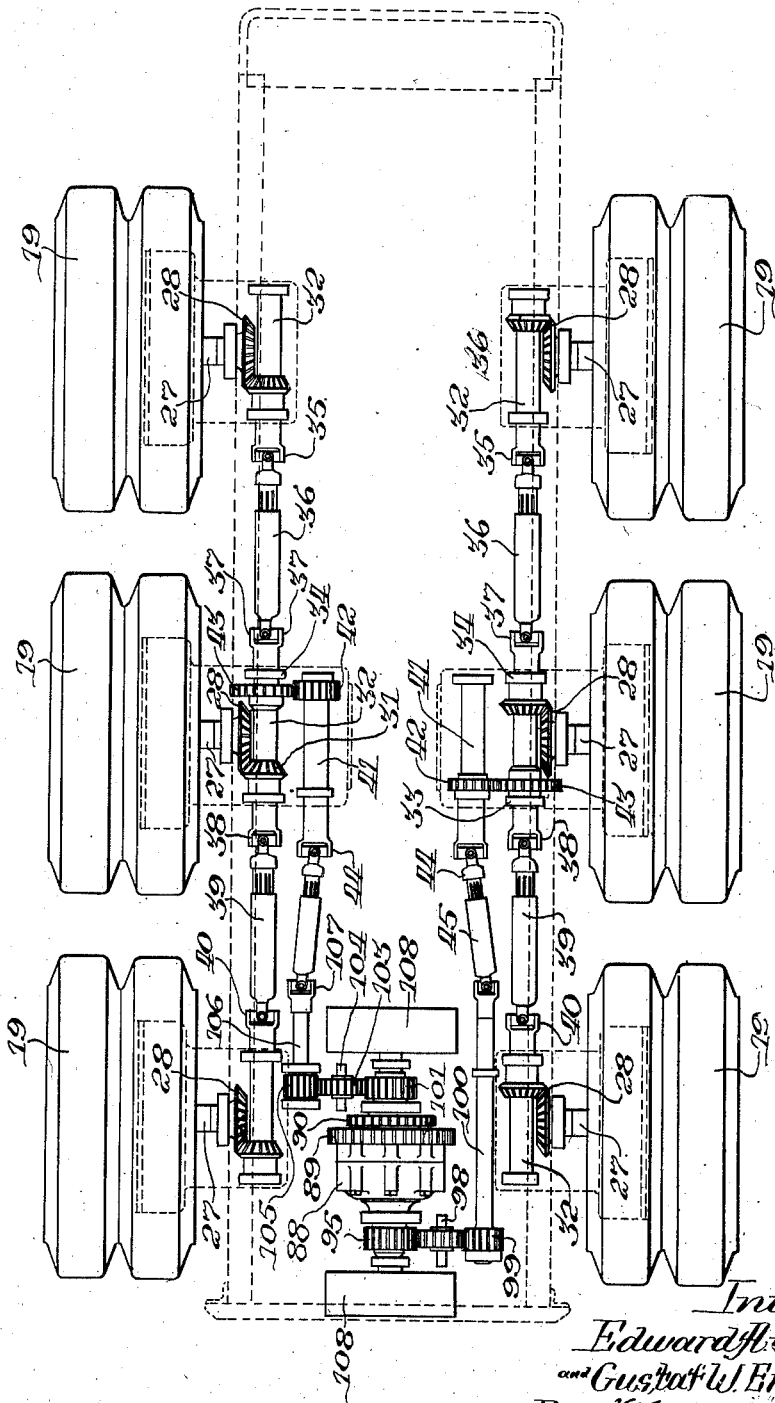
Figure 5 is a phantom view showing the driving mechanism for the wheels including the differential power divider, certain of the housings and the tractor frame being shown in dotted lines to illustrate the relative positions of the driving shafts and gears with respect to the other parts of the tractor.

As best shown in Figures 4 and 5, the central housing 21 at each side is provided with an integrally projecting extension to provide means for housing a drive shaft 41. Each of said shafts carries a gear 42 meshing with a gear 43 carried by the drive shaft 32 of the central housing. It is to be understood that the drive shaft 41 is mounted in suitable bearings carried by the housing 21. Each of the shafts 41 extends forwardly and is connected by a universal joint 44 with an extensible propeller shaft assembly 45. The description of the drive mechanism will be discontinued at this point and later continued into connection with the drive from the power divider, which is mounted on the tractor frame.

The final drive housings, which have been considered as a unitary construction identified by the reference character 21, will now be described as to their mounting on the tractor frame. Each housing 21 is provided on the upper side with an attaching face to which a bracket 46 is rigidly secured. Said bracket includes transversely upwardly extending apertured ears 47. A quarter elliptic leaf spring 48 is pivotally connected on a transverse axis to the bracket 46 by means of a pivot pin 49 extending transversely through the apertured ears 47.

Figure 6:
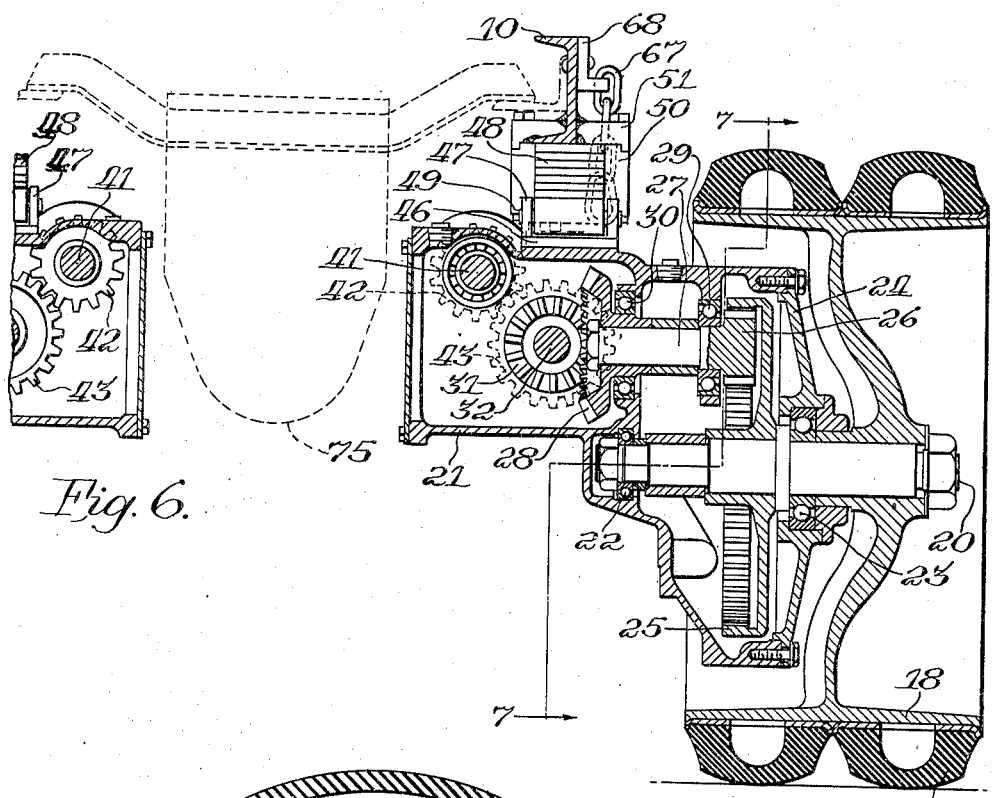
Figure 6 is a transverse vertical section through the center of one of the center drive wheels showing the drive mechanism therefor, and a portion of the power dividing transmission.

The forward springs 48 are connected by clamps 50 to the transverse frame member 11 at the front end of the tractor. The center and rear springs 48 are connected by the clamps 50 to laterally extending brackets 51 welded or otherwise secured to the side frame members 10. Figure 6 best shows the construction of the brackets 51. It will be noted that the side frame members 10 are channel shaped in cross section with the open side of the channel toward the center of the tractor. The brackets 51 are in two parts projecting laterally both inwardly and outwardly from the side frame member 10.

At each side of the tractor forwardly of each of the housings 21, a supporting member in the form of a plate 52 is rigidly connected to the side frame member 10. Said plate extends downwardly, being reduced in width to clear the housing 21. It will be understood that the plates 52 are in pairs, being in transverse alignment. The lower ends of each pair are connected by a transverse stabilizer bar 53, one of which is clearly shown in Figure 2. Said bars are provided with flanged end portions 54, which are rigidly secured to the plates 52 by a plurality of bolts. An inspection of Figure 4 will show that the rear stabilizer bar 53, which connects the rear pair of plates 52, is somewhat different in formation. Said bar forms a means for connecting a draw-bar 55, which is pivoted to the bar 53 by a pin 56. The draw-bar extends rearwardly, being carried for lateral sliding movement between two spaced angle bars 57. Said bars are rigidly secured at their ends to vertical bars 58 which are bolted to the side frame members 10, as clearly shown in Figures 1 and 3.

Figure 7:
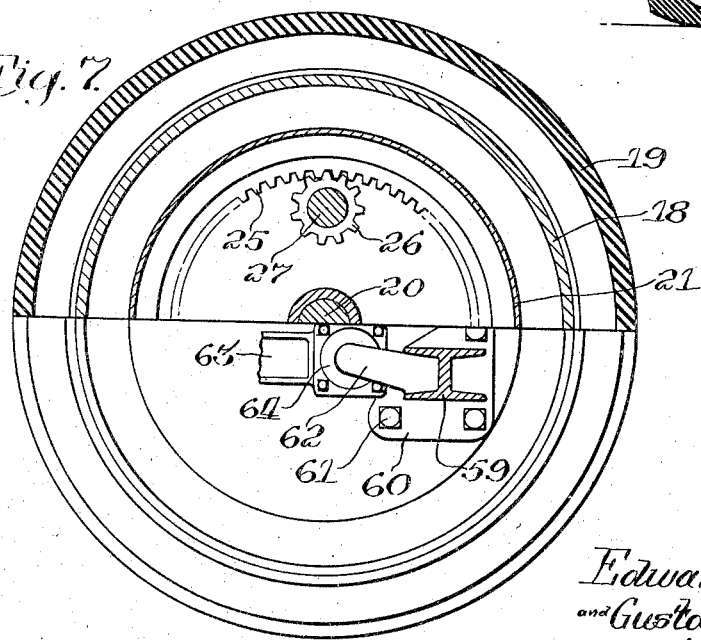
Figure 7 is a section taken on the line 7—7 of Figure 6.

As shown in Figures 1 and 7, the pairs of housings 21 are rigidly secured with respect to each other by a stabilizer bar in the form of an I-beam 59. Said I-beam, which is preferably a forging, is formed with an integral head 60 at each end. Said head is formed with a vertical face which abuts a corresponding face on the housing 21, being rigidly secured thereto by a plurality of cap screws 61. This beam forms a single unit of the transversely positioned housings, allowing, however, up and down movement of each end substantially independent of the other end. There is, of course, a change in angularity of one of the wheels at one side when the wheel at the other side moves up and down. The suspension system is, however, of sufficient flexibility to take care of this slight angular displacement. The driving mechanism being provided with universal joints is completely flexible and is not affected by either up and down displacement or angular change in the position of the wheel.

Figure 2:
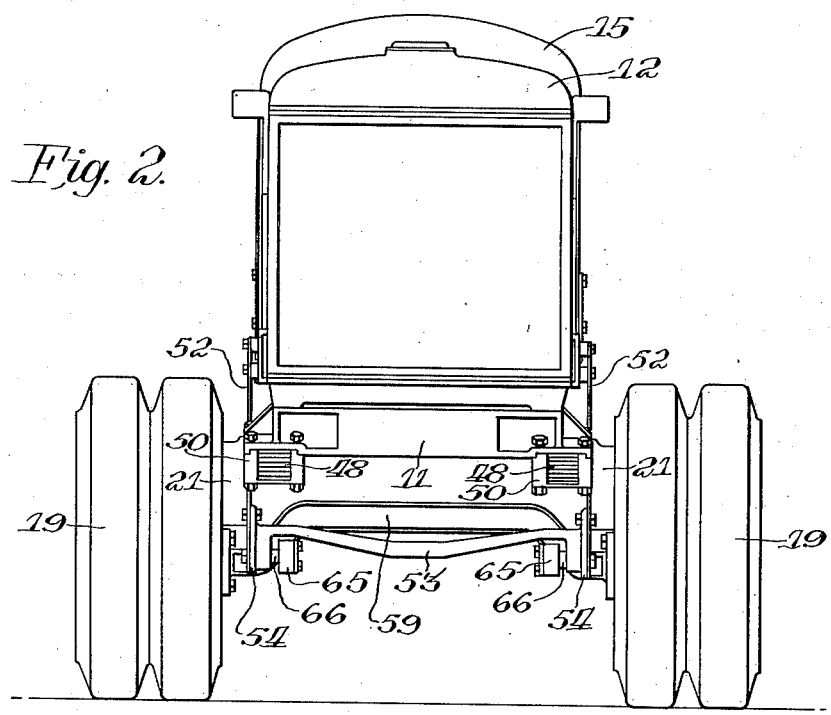
Figure 2 is a front elevation of the tractor shown in Figure 1.

Adjacent each end of each of the beams 59, an extension 62 is rigidly carried by the beam to form a support for a radius rod 63. Said radius rod is connected by a conventional universal ball joint construction 64 with the extension 62. As best shown in Figure 2, the other end of the radius or torque rod 63 is pivotally connected by a ball type universal joint 65 with an extension arm 66 carried adjacent the head portions of the stabilizer bars 53. The ball joint construction at the ends of the torque rods 63 allow the necessary end movement, angular movement and up and down movement of the housings 21, while holding them for movements of translation only in the up and down direction. It will be noted that the attaching points of the springs 48 on the frame, the pivot points of the springs on the brackets 46 and the axes of the ball joints 64 and 65 are such as to provide a substantially parallel linkage.

To hold the housings 21 and the wheels carried thereby against excessive downward movement with probable injury to the supporting linkage and to the springs, chains 67 are attached to brackets 68 secured to the side frame members 19 above the rear portions of the housings 21. At their lower ends, the chains 67 are connected to brackets 69 mounted on the housings 21, as shown in dotted lines in Figure 6 and in full lines in Figure 1. These chains are of a length sufficient to permit the required up and down movement of the wheels during normal operation.

Figure 10:
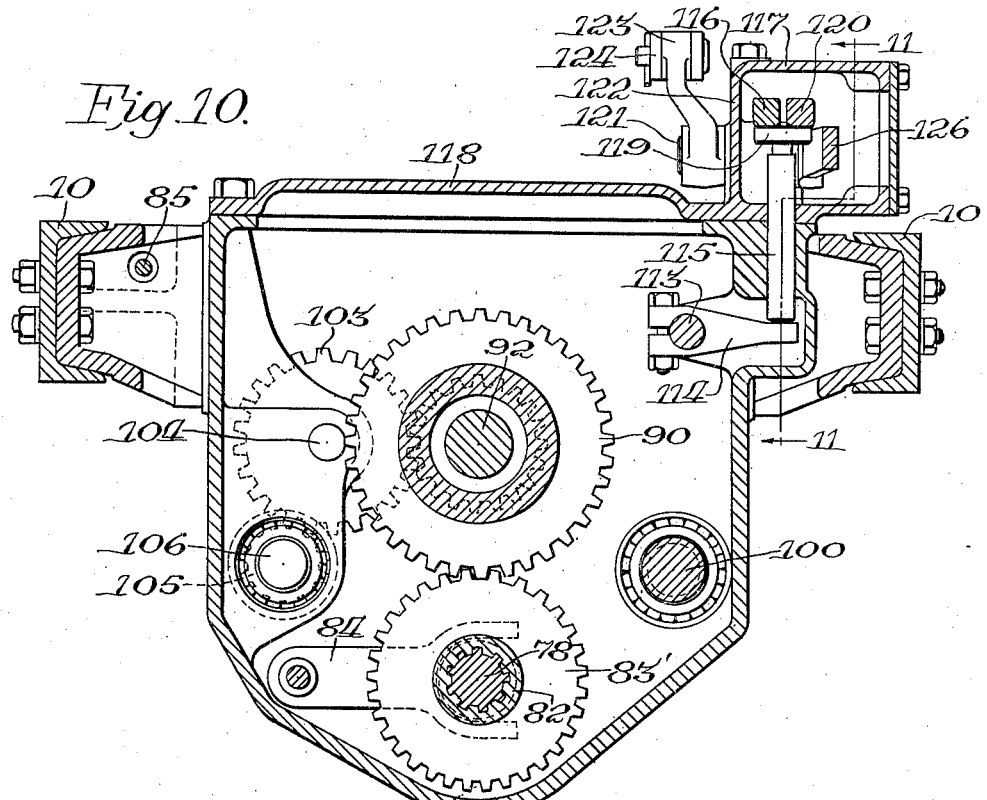
Figure 10 is a section taken on the line 10—10 of Figure 8.

In Figure 4, an engine 70 has been diagrammatically indicated as being supported on the frame of the tractor. At the rear of the engine, a clutch housing 71 is illustrated from which a drive shaft 72 extends. Said shaft is connected by a universal joint assembly 73 to a shaft 74. Said shaft extends into a transmission casing 75 which contains the usual change speed transmission. From the transmission, as shown in Figure 9, a drive shaft 76 extends rearwardly, being connected by a universal joint 77 with a drive shaft 78, which extends into a power divider casing 79 supplying the entire engine power thereto at a speed and torque depending upon the gear ratio in the transmission 75. The shaft 78 is rotatably supported in ball bearing assemblies 80 and 81, suitably mounted in the casing 79. A gear cluster 82, including a small gear 83 and a considerably larger gear 83', is slidably splined on the shaft 78 within the casing between the ball bearing assemblies 80 and 81. As best shown in Figure 10, a shifter fork 84, of conventional construction, is adapted to be operated by a control rod 85, shown best in Figure 8. The dotted lines in Figure 9 indicate the manner in which the shifting fork is moved by the control rod 85. This construction has not been shown in detail, as it does not form a part of the present invention. The control extends forwardly, as shown in Figures 10 and 12, and is secured to the control lever 17.

The casing 79 is formed with large longitudinally aligned openings 86 at its end walls. These openings provide for the reception of flanged bearing supporting sleeves 87 substantially identical in construction at each end of the casing. The flanges of the sleeves provide means for rigidly securing the sleeves to the casing.

A differential assembly is mounted in the casing 79. The internal construction and the planetary gears, which make up a differential, have not been shown, as any conventional construction may be utilized. The construction as shown is of a known type, as disclosed in the United States Patent to White, 1,253,319. The differential casing 88 is shown as being composed of two main parts secured together by bolts. A drive gear 89 mounted on one part of the differential casing is adapted to be engaged and driven by the gear 83 when the gear cluster 82 is shifted in one direction. A second gear 90, smaller in diameter than the gear 89, is also carried by the differential casing. The gear 90 is positioned to be engaged by the gear 83' when the gear cluster 82 is shifted in one direction. The differential assembly includes shafts 91 and 92 extending from the casing 88 in opposite directions. With the axis of the differential assembly arranged longitudinally of the tractor, a simplified gear arrangement may be utilized to transmit power to the differential casing and from the shafts 91 and 92 to the final drive mechanism without the use of bevel gears. The shafts 91 and 92 extend centrally through the sleeves 87 and thereby through the opposite end walls of the casing projecting beyond said end walls. Each of the sleeves 87 is formed with a shouldered recess at the inner end to form a support for a ball bearing assembly 93, and a shouldered recess at the outer end adjacent the end wall of the casing to form a support for a smaller ball bearing assembly 94. The bearing assemblies 93 and 94 form rotatable supports for the differential shafts 91 and 92 at axially spaced locations.

The shaft 91 carries a gear 95 mounted between the bearing assemblies 93 and 94. As best shown in Figure 8, the sleeve 87 is cut away by an arcuate slot 96 at one side to permit meshing engagement of a gear 97 with the gear 95. The gear 97 is an intermediate gear rotatably mounted in the casing on a short shaft 98, as shown in Figure 5, for the purpose of transmitting power to a gear 99 mounted on a longitudinally arranged drive shaft 100. Said shaft extends from the casing, as shown in Figures 5, 8 and 10, and is connected by a universal joint with the propeller shaft assembly 45, previously described.

The construction at the forward end of the power divider for delivering power to the other side of the tractor is exactly the same. It is shown, however, better in Figure 10, as the forward portion of the transmission can be seen in this view. A gear 101 is carried by the differential drive shaft 92 intermediate the bearing assemblies 93 and 94 at that end. Through an arcuate slot 102 in the sleeve 87 at that end, the gear 101 meshes with a gear 103, as shown in Figures 8 and 10, which is carried by a short shaft 104. The gear 103 meshes with a gear 105, as best illustrated in Figure 5 and as shown in dotted lines in Figure 10, which is carried by a drive shaft 106. The shaft 106 extends forwardly through the front wall of the differential casing and is connected by a universal joint 107 with the extensible propeller shaft assembly 45 at that side of the tractor.

By means of the use of a power divider, as has been above described, it will be understood that power supplied from the transmission through the shaft 76 is applied at two selectable gear ratios to the differential casing 88. Said casing, which contains a conventional differential, divides the power between the driving shafts 91 and 92. The shaft 91 supplies power to the final drive mechanisms at one side of the tractor through the system of shafts, universal joints and gears, as described, and the shaft 92 similarly supplies power to the other side of the tractor.

Figure 3:
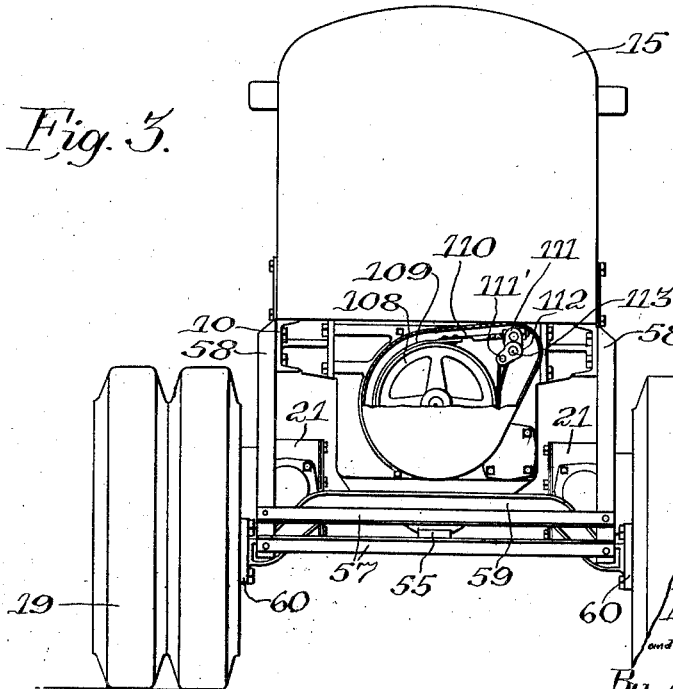
Figure 3 is a rear elevation of the tractor shown in Figure 1 with a portion of the brake drum housing broken away to show the actuating mechanism for the brake.

A brake drum 108 is secured to the extending end portion of the shaft 91 at the rear of the power divider casing. A second drum 108 is secured to the forwardly extending shaft 92. A flexible brake band 109 surrounds each brake drum being anchored on an operating member, as best shown in Figures 3 and 8. One end of the band 109 is secured by an adjustable element 110 to one ear 111 of the operating member shown at 112. The other end of the band is secured by a looped end portion to another ear 111' formed on the operating member 112. The member 112 is rigidly carried on an operating shaft 113, which extends into the power divider casing, as best shown in Figure 8. The casing is formed with a suitable bearing for the operating shaft 113.

Figure 11:
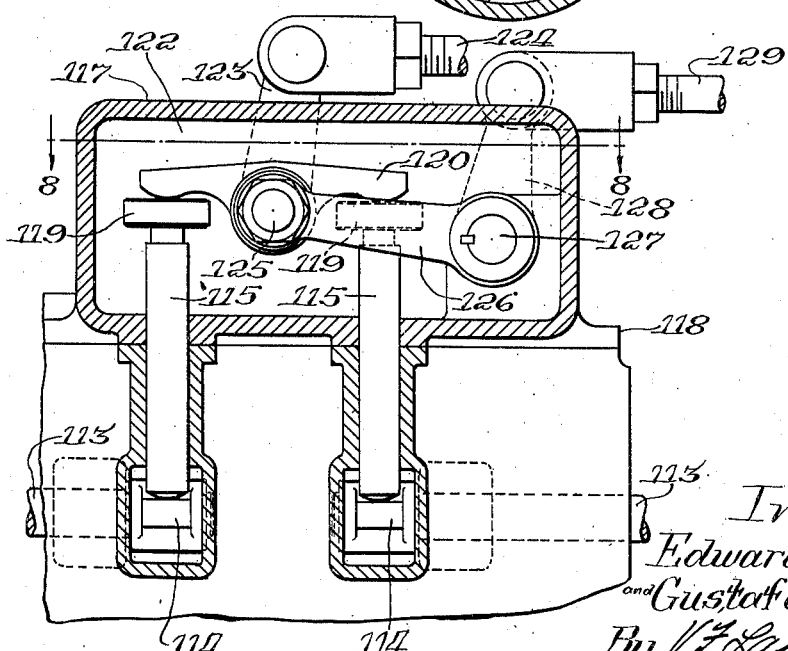
Figure 11 is a section taken on the line 11—11 of Figure 10.

Substantially centrally of the casing 79, an operating arm 114 is secured to the end of the shaft 113. Said arm extends laterally into a position to be engaged by a vertical plunger 115. Said plunger is positioned to be operated by a rocker arm 116 mounted on a transverse axis in a housing 117 formed on a cover plate 118, which is secured to the open top of the casing 79. The operating means for the brake at the other end of the power divider casing is identical, except that it extends rearwardly of the casing. The elements are identified, therefore, by the same reference characters. Referring to Figure 10, the parts 115 to 118 are clearly shown on a large scale. Figure 11 also shows several of these parts.

It will be noted in Figures 10 and 11 that the operating plungers 115, for engagement with the brake actuating arms 114, are formed with enlarged flat heads 119. By the use of this enlarged head, the rocker arm 116 may engage one portion of the head and a second rocker arm 120 may engage another portion of the head. As shown in Figures 8, 10 and 11, the rocker arm 116 is rigidly mounted on a short actuating shaft 121 which extends laterally through a vertical wall 122 of the housing 117. It will be noted in Figure 8 that this shaft terminates at the hub of the rocker arm 116 and that the rocker arm 120 is spaced from the rocker 116 so that the operation of one of the rocker arms is independent of the other. A crank arm 123 rigidly secured to the outer end of the shaft 122 is connected by an operating link 124, as shown in Figures 11 and 12, with the operator's control lever 16. The specific way in which this operating link is connected has not been shown as it is obvious that its actuation depends only on a fore and aft movement. Referring to Figure 11, when the operating link 124 is pulled forwardly, the forward plunger 119 is pushed downwardly thereby applying the brake at the forward end of the power divider. As the brake is applied to this end of the differential, the speed of the left hand side is reduced and the speed of the right hand is increased. Power is continued, however, to be applied to each side at different speeds, referring particularly to Figure 5. This action tends to turn the tractor toward the side at which the braking effort is applied. This type of steering, in itself, is quite old being very similar to the steering of the conventional crawler type tractors.

When the operating link 124 is pushed rearwardly, the plunger 115 at the rear is applied, thereby applying braking effort on the drum at the rear of the power divider casing. The delivery of power to the right side of the tractor, referring to Figure 5, is reduced by this action depending upon the amount of braking effort applied. The tractor is then turned in the opposite direction toward the left.

The rocker arm 120 is pivotally carried on a pivot pin 125, which is carried by an actuating arm 126. Said arm is rigidly mounted on an operating shaft 127 extending laterally through the vertical wall 122 of the extension housing 117. Outside the housing, an actuating arm 128 is secured to the shaft 127. An actuating link 129 is secured to the arm 128 and extends forwardly to the operator's control lever 16', as shown in Figure 12. The connection of this link has not been shown in detail, as any mechanism for manually applying pressure to the link is effective to operate the brake mechanism.

When pressure is applied rearwardly to the link 129, the lever arm 126 acts to apply pressure equally divided between both of the plungers 115. By this action the brakes at both ends of the power divider casing are applied. There is no action tending to steer a tractor as braking effort is, by this mechanism, simultaneously applied to both sides of the tractor.

The operation of the different mechanisms contained in the tractor above described have been explained in connection with the description. The action of the suspension system has also been clearly explained during the description of the component parts. The principal features of this construction are the suspension spring including the stabilizer beams and the bars beneath the tractor, the drive mechanism including the power dividing means, the final drive mechanism and the braking system, both for steering and for applying braking against movement of the tractor.

It is to be understood that applicants have shown and described only a preferred embodiment of their improved multiple wheel tractor with drive to all of the wheels, and that they claim as their invention all modifications falling within the scope of the appended claims.

What is claimed is:

1. In a tractor having a plurality of independent drive units, the combination with the frame of the tractor, of an axle drive housing secured at each side of the frame by means providing for upward movement against spring pressure, an axle extending from each housing, a drive wheel carried by each of said axles, means including gearing in the housings for supplying power to said axles, a supporting member secured to each side of the tractor frame forwardly of each of the housings, a stabilizer bar secured between said members, torque rods secured adjacent the lower end of the members and to the housings, and a draw-bar connected to said stabilizer bar.

2. In a tractor having a plurality of independent drive units, the combination with the frame of the tractor, of an axle drive housing secured at each side of the frame by means providing for upward movement against spring pressure, an axle extending from each housing, a drive wheel carried by each of said axles, means including gearing in the housings for supplying power to said axles, a supporting member secured to each side of the tractor frame forwardly of each of the housings, a stabilizer bar secured between said members, torque rods secured adjacent the lower end of the members and to the housings, a draw-bar pivotally connected to said stabilizer bar and extending rearwardly therefrom, and a supporting structure connected to the tractor frame for supporting the rear end of the draw-bar against movement in a vertical direction.

3. In a tractor having a plurality of drive units at each side thereof, the combination with the frame of the tractor, of independent axle drive housings secured at opposite sides of the frame in transverse alignment by means providing for upward movement against spring pressure, stop means connected to each housing and engageable with the frame for positively limiting movement of the housing in a downward direction, an axle extending from each housing, a drive wheel carried by each of said axles, means including gearing in the housings for supplying power to said axles, transverse stabilizer bars secured to each pair of housings, a supporting member secured to each side of the tractor frame forwardly of each of the housings, and torque rods secured adjacent the lower end of the members and to the housings.

4. In a tractor having a plurality of drive units at each side thereof, the combination with the frame of the tractor, of axle drive housings secured at each side of the frame by means providing for upward movement against spring pressure, an axle extending from each housing, a drive wheel carried by each of said axles, means including gearing in the housings for supplying power to said axles, means for simultaneously applying driving power to all of the axles at either side of the tractor, a supporting member secured to each side of the tractor frame forwardly of each of the housings, and torque rods secured adjacent the lower end of the members and to the housings.

5. In a tractor, the combination of a leaf spring rigidly secured at one end to the tractor, an axle drive housing pivotally secured to the other end of said spring, an axle extending from each housing, a drive wheel carried by said axle, means for supplying power to said axle, a supporting member secured to the tractor frame forwardly of said housing and extending downwardly in front of the housing, and a torque rod pivotally connected at one end to said supporting member and pivotally connected at the other end to the housing, said connection being located relative to the connections of the spring to form substantially a parallel linkage.

6. In a tractor, the combination of a leaf spring rigidly secured at one end to the tractor at each side thereof, an axle drive housing pivotally secured to the other end of said spring, an axle extending from each housing, a drive wheel carried by said axle, means for supplying power to said axle, a supporting member secured to the tractor frame forwardly of each of said housings and extending downwardly in front of the housing, a torque rod at the side of the tractor flexibly secured to the supporting member and to the housing, a transverse stabilizing member rigidly connected to said housings and a transverse stabilizing member rigidly connected to the lower end of the supporting members.

7. In a tractor having a frame and a plurality of drive units at one side thereof, the combination with the frame of the tractor of dependent axle drive housings secured longitudinally spaced at one side of the frame, means for connecting said housings to the frame providing for upward movement against spring pressure, stop means connected to each housing and engageable with the frame for positively limiting downward movement of the housing, a drive wheel carried by each of said axles, a supporting member secured to each side of the tractor forwardly of each of the housings, and a torque rod secured to each housing and to the supporting member.

8. In a tractor having a frame and at least three drive units at one side thereof, the combination with the frame of the tractor of dependent axle drive housings secured longitudinally spaced at one side of the frame, means for connecting said housings to the frame providing for upward movement against spring pressure, stop means connected to each housing and engageable with the frame for positively limiting downward movement of the housing whereby during operation of the tractor over irregular ground conditions the tractor may be supported on two of the units with the other unit being supported by the stop means, a drive wheel carried by said axles, a supporting member secured to each side of the tractor forwardly of each of the housings, and a torque rod secured to each housing and to the supporting member.

9. In a tractor, the combination of a leaf spring rigidly secured at one end to the tractor, an axle drive housing pivotally secured to the other end of said spring, an axle extending from each housing, a drive wheel carried by said axle, means for supplying power to said axle, a supporting member secured to the tractor forwardly of said housing and extending downwardly in front of the housing, a torque rod pivotally connected at one end to said supporting member and pivotally connected at the other end to the housing, said connection being located relative to the connections of the spring to form substantially a parallel linkage, and stop means connected to the housing and engageable with the tractor for positively limiting movement of the housing in a downward direction.

EDWARD A. JOHNSTON.
GUSTAF W. ENGSTROM.